(12) United States Patent
Lewis et al.

(10) Patent No.: US 8,220,622 B1
(45) Date of Patent: Jul. 17, 2012

(54) FOLDABLE HOLDER FOR ABSORBENT PAD

(75) Inventors: Tony H. Lewis, Grand Prairie, TX (US);
Kathy Bassininski, Burleson, TX (US)

(73) Assignee: The Bramton Company, Irving, TX (US)

( * ) Notice: Subject to any disclaimer, the term of this patent is extended or adjusted under 35 U.S.C. 154(b) by 0 days.

(21) Appl. No.: 13/368,002

(22) Filed: Feb. 7, 2012

(51) Int. Cl.
  *A01K 29/00* (2006.01)
  *B65D 6/04* (2006.01)
(52) U.S. Cl. ....... 206/204; 206/565; 220/4.22; 119/168; 119/169
(58) Field of Classification Search ............... None
  See application file for complete search history.

(56) References Cited

U.S. PATENT DOCUMENTS

| | | | |
|---|---|---|---|
| 3,827,401 A * | 8/1974 | Franzl | 119/169 |
| 5,144,914 A * | 9/1992 | Giannakopoulos | 119/168 |
| 6,269,772 B1 * | 8/2001 | Mickey | 119/166 |
| 6,321,911 B1 * | 11/2001 | Raimer et al. | 206/509 |
| 7,621,233 B2 * | 11/2009 | Dukes et al. | 119/165 |
| 8,113,146 B2 * | 2/2012 | Askinasi | 119/169 |
| 2004/0079672 A1 * | 4/2004 | D'Olimpio et al. | 206/565 |
| 2008/0196671 A1 * | 8/2008 | Dukes et al. | 119/163 |
| 2009/0241851 A1 * | 10/2009 | Peddycoart | 119/168 |

* cited by examiner

*Primary Examiner* — Jacob K Ackun
(74) *Attorney, Agent, or Firm* — Locke Lord, LLP

(57) ABSTRACT

A holder for an absorbent pad, the pad holder having two halves with a bottom wall section bounded by a hinged side and a plurality of wall-in sides, the hinged sides of the two halves cooperating to make the pad holder foldable for packaging, shipment and storage, at least one selectively releasable locking or latching mechanism to hold the pad holder in an unfolded position during use, and a plurality of spaced-apart, selectively releasable pad attachment devices, each preferably disposed in a corner wall section, to limit relative motion between the pad holder and an absorbent pad installed inside it without pressuring any portion of the absorbent pad against the bottom wall.

16 Claims, 12 Drawing Sheets

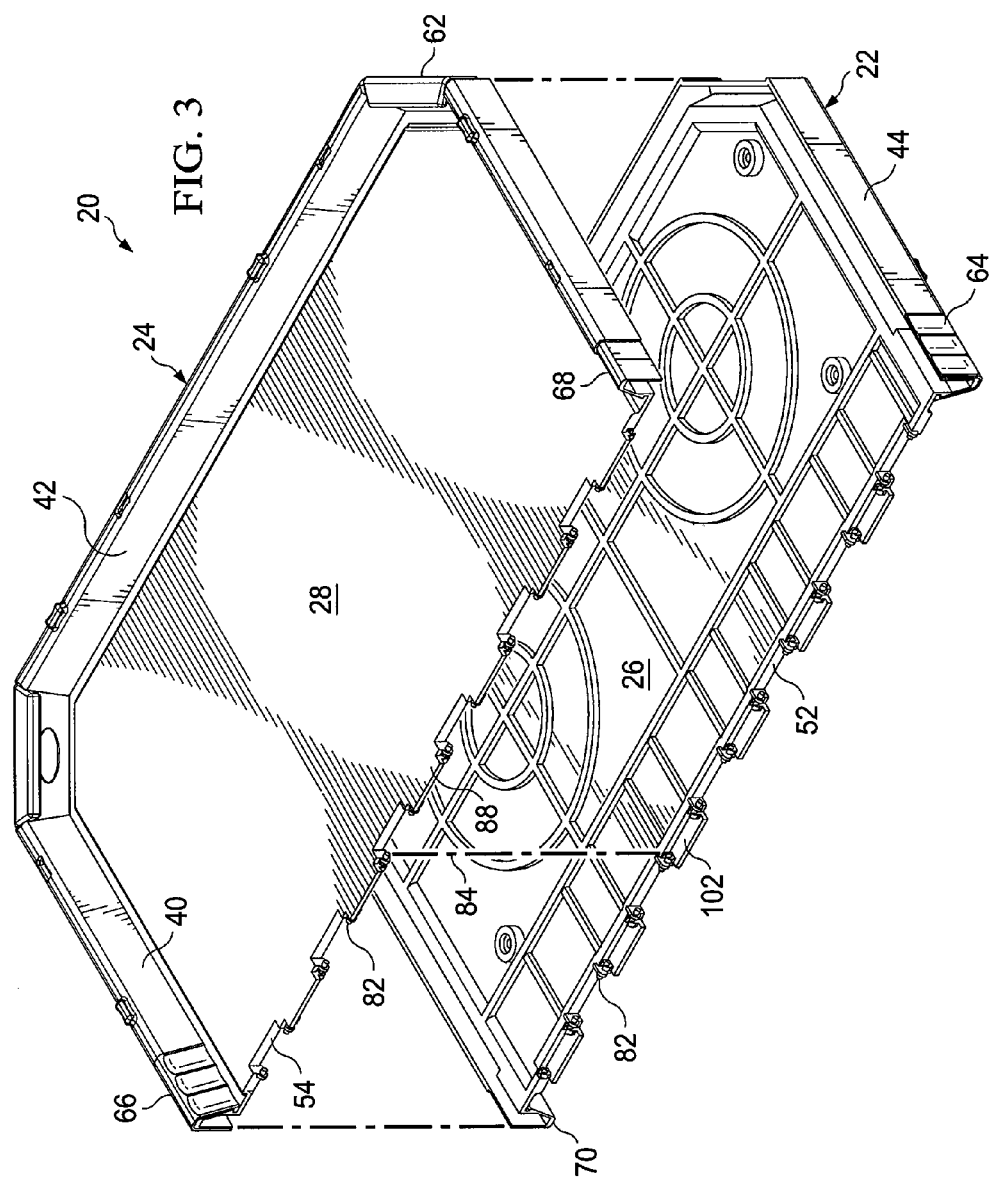

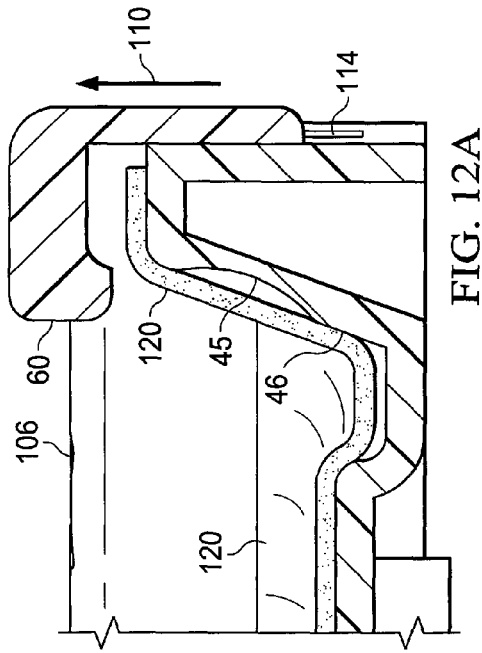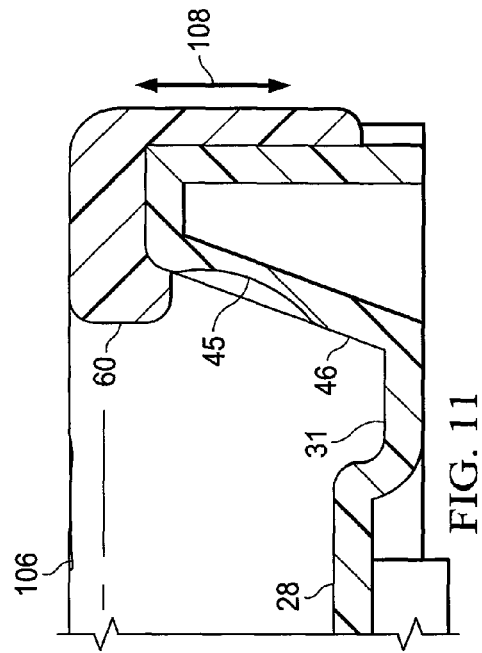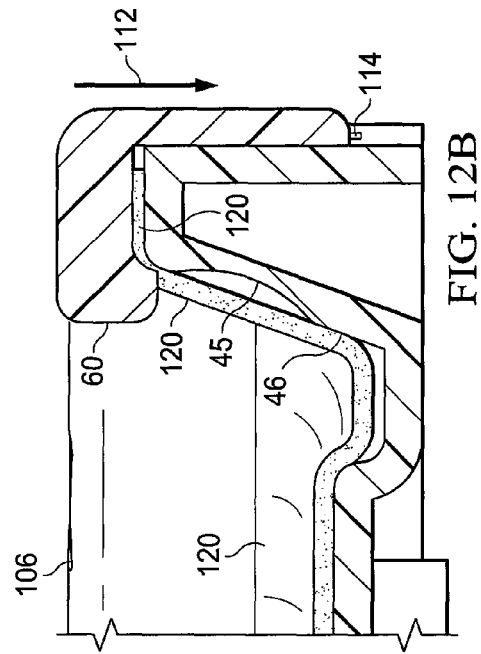

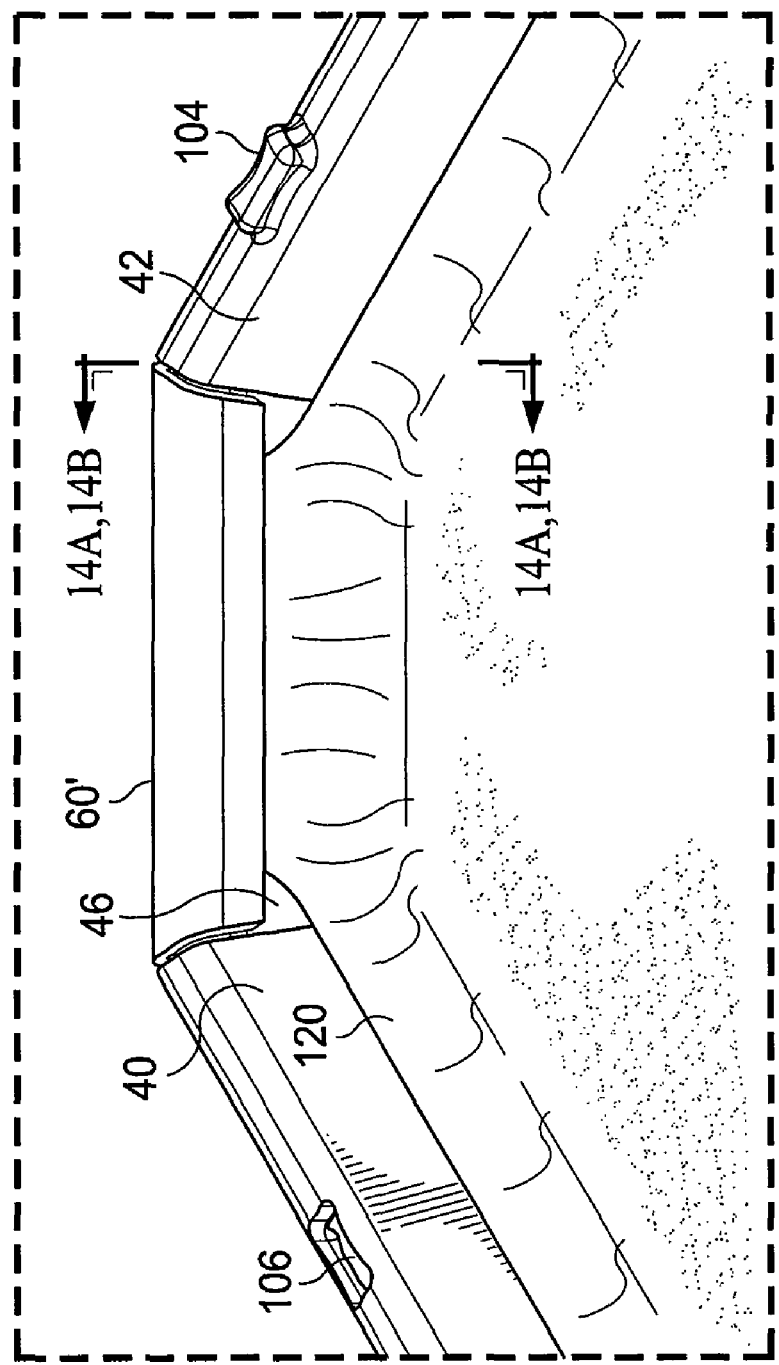

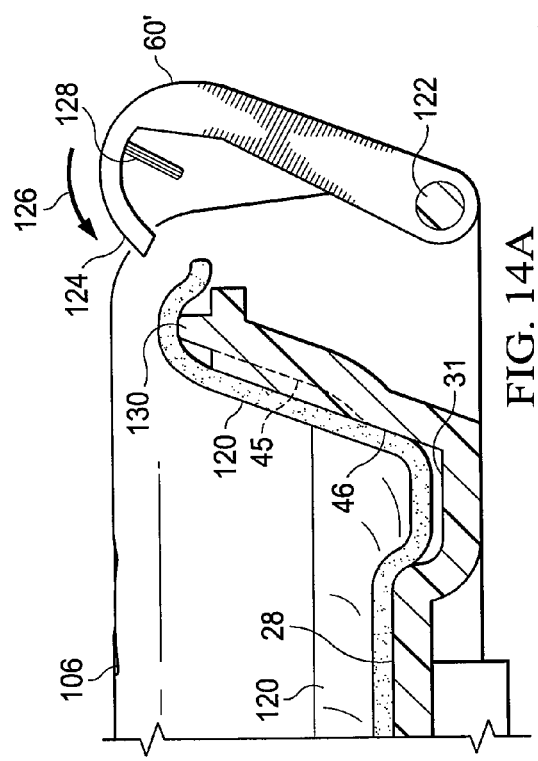
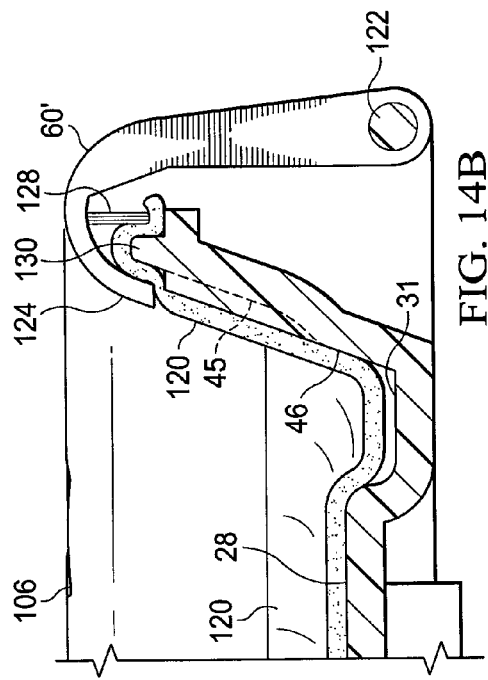

FOLDABLE HOLDER FOR ABSORBENT PAD

BACKGROUND OF THE INVENTION

1. Field of the Invention

This invention relates to a holder for an absorbent pad for liquids, and more particularly, to a reusable holder for pads that, as an example, absorb animal urine. Such pads are often referred to as "puppy training pads." It will also be apparent to those of ordinary skill in the art upon reading the present disclosure, however, that the pad holder disclosed herein is similarly useful for holding and stabilizing liquid absorbent pads or pads comprising liquid adsorbents, or pads comprising both absorbent and adsorbent materials (all of which are referred to herein as "absorbent pads" for convenience), for application other than as puppy training pads. The pad holders of the invention can also be used, for example and without limitation, to hold and stabilize pads used with other types of animals, or in cages or crates, or under motor vehicles in repair shops, or for craft projects, or to help protect tables, or as drip or catch pads for various types of spills, such as paint, water, glue, or the like.

2. Description of Related Art

In the past, holders for absorbent pads have been made in numerous different configurations. Because the commercially available absorbent pads are generally rectangular or square, the pad holders are typically similarly shaped. Some conventional pad holders are relatively flat and others have sidewalls. Some conventional pad holders have frames with bottoms, some have no bottoms, and various mechanisms have previously been disclosed for securing pads in or to the pad holders. Examples of some other pad holders are disclosed in U.S. Pat. Nos. 7,763,338; 6,059,247; and 6,450,119; in U.S. Pub. No. 2010/0300367; and in other patents cited therein.

SUMMARY OF THE INVENTION

The pad holder disclosed herein desirably comprises two halves, with each half further comprising a bottom wall section bounded on all but one side by upwardly extending side wall sections. One side of the bottom wall section is not bounded by an upwardly extending wall section and preferably comprises a plurality of spaced apart hinge elements that allow the two halves to be joined and folded back against themselves so that the undersides of the two halves are in facing juxtaposition when the pad holder is folded for shipment and storage, and for display at the point of sale. Sliding latches or other similarly effective known devices are desirably provided for locking the two halves of the pad holder in an unfolded position with the bottom wall sections substantially flat when the pad holder is deployed for use.

According to one embodiment of the invention, the corners of each half are truncated where two upwardly extending intersecting side wall sections would ordinarily abut each other to form a corner in a conventional rectangular pad holder, and a corner wall section is desirably disposed at each truncated corner. Each corner wall section is disposed obliquely relative to the closest adjacent side wall sections and each end of each corner wall section is connected to or unitarily formed together with an end of an adjacent side wall section, so that each half of the subject pad holder desirably comprises three side wall sections alternating with and separated by two corner wall sections. When the two halves of a pad holder configured in this manner are joined at the hinges with the bottom wall laid flat, a pad holder is formed that has a polygonal shape with eight sides and a bottom. The eight sides of the assembled pad holder desirably comprise four longer side wall sections alternating with four shorter corner wall sections. Two side wall sections of each half of the pad holder are disposed transverse to a hinge line separating the bottom wall sections of the two halves, one at each end thereof, and the two transverse side wall sections of each half are longitudinally aligned with two side wall sections of the other half when the two halves are hinged together. A releasable locking element is desirably provided to prevent the two halves from folding about the hinge line while the pad holder is disposed in the unfolded, locking (use) position. As used herein, the term "hinge line" is intended to mean a line of separation between the two halves, although it will be appreciated upon reading this disclosure that the hinge line may not be strictly linear, depending upon factors such as the hinge configuration, manufacturing considerations, and the like.

In another embodiment of the invention, a shallow trough is disposed around the perimeter of the bottom wall at the base of the upwardly extending side wall. The shallow trough can serve as a catch-basin for any excess liquid that may pass through or out the sides of an absorbent pad during use. The bottom wall, side walls and corner walls, and a shallow trough of each half of the absorbent pad holder of the invention can be unitarily molded from a moldable polymeric material and, if desired, other modifications can also be incorporated into the mold. Such modifications can include, for example and without limitation, structural support ribs and/or pedestals disposed on the underside of the bottom wall; or alternating projections and recesses disposed at or near the top surfaces of the side walls and corner walls to facilitate stacking of the subject pad holders for packaging, shipment or storage.

A pad attachment device is desirably provided at each corner position, a principal purpose of which is to secure to the pad holder a corner of an absorbent pad that is spread out across the upwardly facing surface of the bottom wall. The length and width of the assembled pad holder are desirably such that at least a portion of an absorbent pad used with the device will extend sufficiently beyond the bottom wall that a pad attachment device disposed at each corner of the pad can releasably grasp and hold some portion of pad so that the pad will remain spread over the bottom wall during use. Significantly, no portion of the pad holder presses the absorbent pad against the bottom wall. If desired, the dimensions of the pad holder can be selected in such manner that a conventional, commercially available pad is slightly longer and wider than the bottom wall. Alternatively, absorbent pads of a particular dimension can be specially made to fit the pad holder or straps, tabs, or the like, can be provided for use at or near the corners of the pad to attach the pad to the pad holder, provided that the pad attachment device utilized as part of the subject pad holder is able to releasably grasp or hold the corner of the pad in substantially the same position relative to the pad holder from the time the pad is installed in the pad holder until the pad is replaced following a desired period of use.

According to another embodiment of the invention, the pad holder is assembled into a hinge-folded position during manufacture and is stacked together with a plurality of other similarly configured pad holders for packaging or storage. To facilitate stacking of the subject pad holders while in the folded position, the top of each side wall section can be provided, for example and without limiting the particular structure used, with spaced-apart projections and slots or recesses positioned so that, when a pad holder is stacked on another pad holder, the slots or recesses will receive and releasably engage projections from the pad holder stacked either over or under it.

According to another embodiment of the invention, if the subject pad holders are configured so that at least a major portion of the downwardly facing surface of the bottom wall is slightly higher than the floor or other underlying support surface upon which the pad holder rests during use, a plurality of ribs or pedestals are desirably provided on the underside of the bottom wall to prevent the bottom wall from flexing under the weight of an animal eliminating on the pad. Depending upon the material(s) of construction used in making the pad holders, keeping the bottom wall of the pad holder substantially level during use may reduce the likelihood of stress-cracking due to repeated flexing during prolonged use.

The foldable pad holder of the invention is self-contained, yet can be marketed as a one-piece product with no separate detached components or parts to be lost or misplaced. Because the subject pad holder is foldable, it takes up less space on shelves in a store or at home and allows for easier portability. This can be particularly helpful when transporting the device home from the point of sale, or when traveling with a pet, or when storing it during periods when it is not needed. Reduction in the amount of uncovered and unprotected surface area in a pad holder is also a beneficial aspect of the present invention. As compared to conventional pad holders having an extensive amount of exposed plastic surface not covered by the absorbent pad that are subject to wetting with the pet's urine during use, for example, the foldable pad holder of the invention reduces the need for extensive cleaning of such parts and surrounding areas off the pad.

BRIEF DESCRIPTION OF THE DRAWINGS

Other aspects, features, benefits and advantages of the present invention are further described and explained in relation to the following drawings wherein:

FIG. 3 is an exploded top perspective view of the pad holder of FIG. 1 with one half positioned as it would be if folded back under the other, but without the hinge elements being assembled;

FIG. 11 is an enlarged cross-sectional elevation view taken along line 11-11 of FIG. 10;

FIG. 12A is an enlarged cross-sectional elevation view as in FIG. 11 but with a pad attachment device disposed in the upper (unlocked) position to permit installation or removal of an absorbent pad, which is also shown;

FIG. 12B is an enlarged cross-sectional elevation view as in FIG. 12A but with the pad attachment device disposed in the lower (locked) position with a portion of the absorbent pad captured between the underside of the pad attachment device and the top of the corner wall section.

FIG. 14 is a detail perspective view as in FIG. 10 but of an alternate embodiment, showing a corner wall section and a pad attachment device disposed in the locked position over an absorbent pad;

FIG. 14A is an enlarged cross-sectional elevation view taken along line 14A-14A of FIG. 14, but with a pad attachment device disposed in the unlocked position to permit installation or removal of an absorbent pad;

FIG. 14B is an enlarged cross-sectional elevation view as in FIG. 14A but with a pad attachment device disposed in the locked position over an absorbent pad;

Like reference numerals are used to describe like parts in all Figures of the drawings and prime numbers indicate different structural versions of the same component.

DESCRIPTION OF THE PREFERRED EMBODIMENTS

Figure 1:
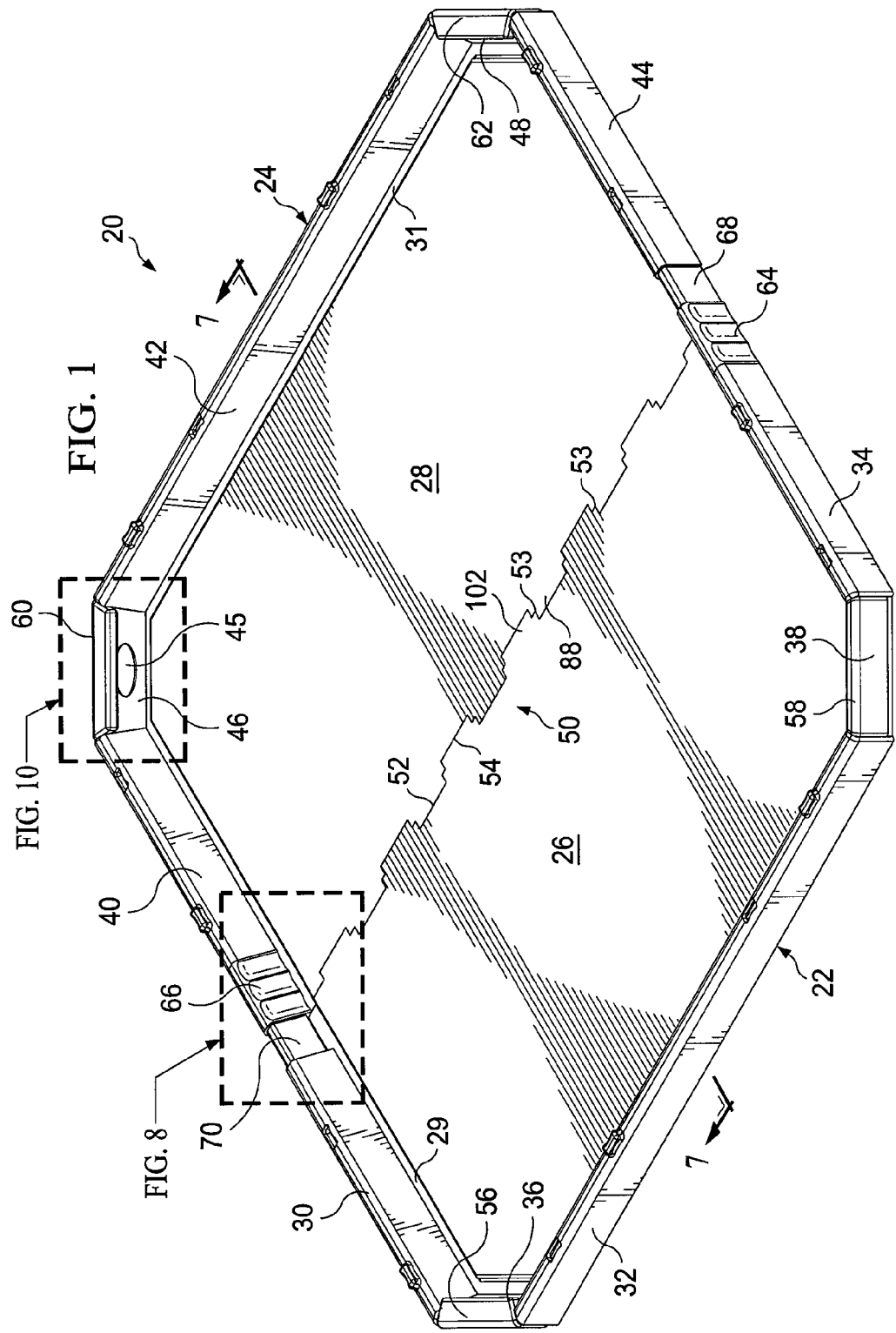
FIG. 1 is a top perspective view of an embodiment of the pad holder of the invention when deployed in the unfolded, hinged position prior to locking the releasable locking elements at each end of the hinge line.

Referring to FIG. 1, pad holder 20 comprises two halves 22, 24 separated by a generally linear hinge line 50 incorporating offset segments 52, 54 joined by irregular segments 53. Half 22 further comprises bottom wall section 26, side wall sections 30, 32 and 34, and corner wall sections 36, 38. Half 24 similarly comprises bottom wall section 28, side wall sections 40, 42 and 44, and corner wall sections 46, 48. In the embodiment shown in FIG. 1, bottom wall sections 26, 28 each further comprises a shallow trough 29, 31, respectively, that extends around the perimeter at the foot of the side wall and corner wall sections except on the hinge side of each bottom wall section. The bottom wall, trough, side wall and corner wall sections of each of the halves 22, 24 of pad holder 20 are desirably unitarily molded from any moldable polymeric resin in a moldable configuration having physical properties and durability that are adequate to achieve the performance characteristics desired by the manufacturer of the subject pad holder 20. Halves 22, 24 of pad holder 20 are desirably unitarily molded with hinge elements that can be conveniently joined together when the halves are lying in either a substantially coplanar or stacked position relative to each other.

It will also be appreciated upon reading this disclosure that bottom wall sections 26, 28, side wall sections 30, 32, 34, 40, 42, 44 and corner wall sections 36, 38, 46, 48 can be molded separately provided that such sections have component parts configured to facilitate assembly to form pad holder 20 and further provided that halves 22, 24 are selectively foldable at hinge line 50. Thus, for example, a plurality of cooperating tabs and slots can be provided to permit the assembly of such component parts into halves 22, 24 within the scope of the invention if desired. Such components can, for example and without limitation, be assembled by snap-fit connections, by the use of conventional fastening devices, or the like.

Figure 7:
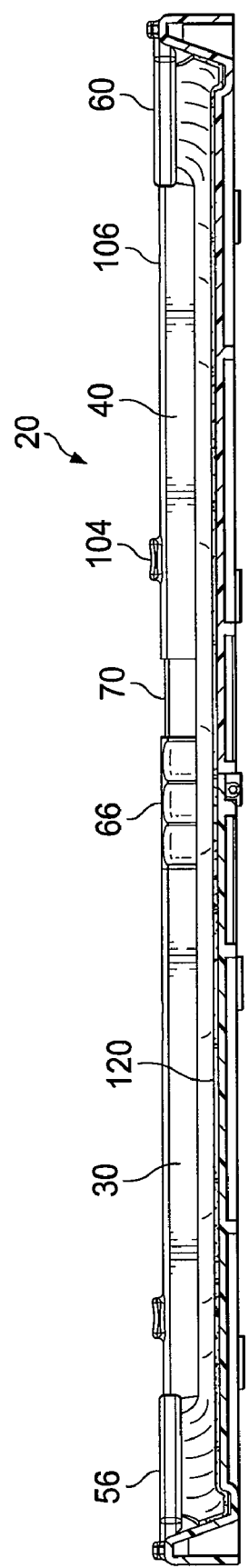
FIG. 7 is a cross-sectional elevation view taken along line 7-7 of FIG. 1, but with an absorbent pad installed inside the pad holder.
Figure 8:
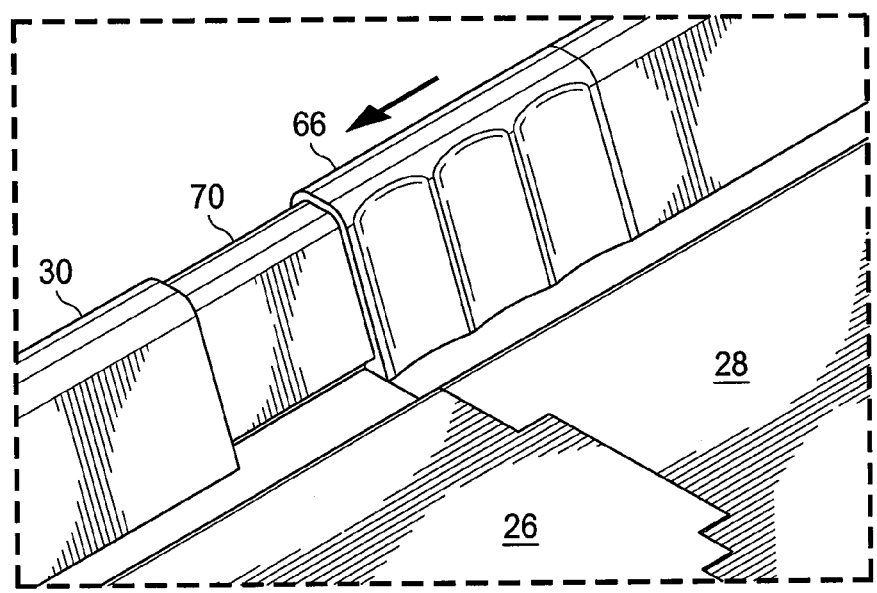
FIG. 8 is a detail perspective view taken from FIG. 1, showing a releasable locking element disposed in the unlocked position.
Figure 9:
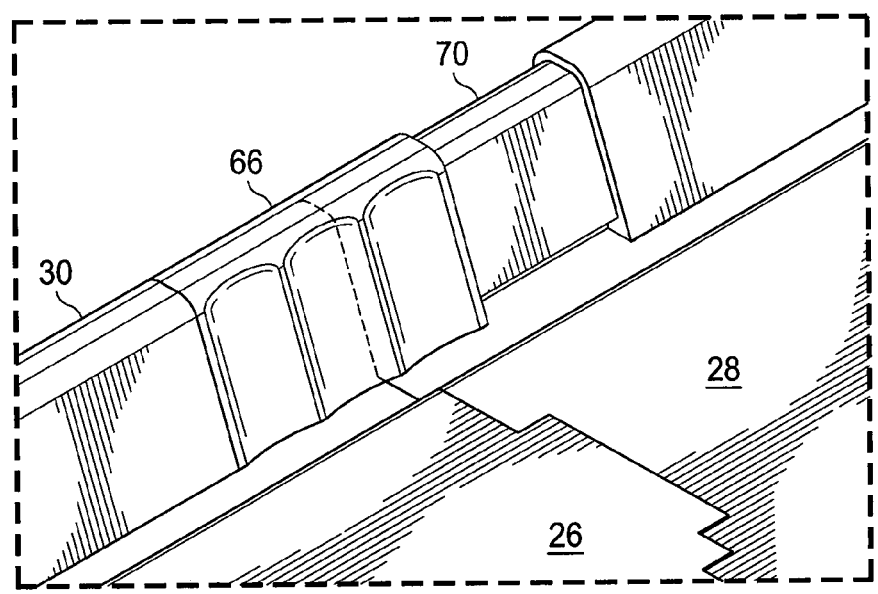
FIG. 9 is a detail perspective view as in FIG. 8 but showing the releasable locking element disposed in the locked position.

According to one embodiment of the invention, a releasable latch mechanism 64, 66 is desirably provided at each end of hinge line 50 for use in bridging the line of separation between halves 22, 24. When halves 22, 24 of pad holder 20 are in the positions shown in FIG. 1, bottom wall sections 26, 28 cooperate to form one substantially coplanar, substantially continuous bottom wall and side wall sections 30, 40 and 34, 44 are cooperatively aligned. When the bottom wall and side walls are in the position shown, releasable latch mechanisms 64, 66 are desirably moved from the unlatched position shown in FIG. 1 to a latched position by sliding latch mechanisms 64, 66 so that one latch mechanism bridges the line of separation between side wall sections 34, 44 and another latch mechanism bridges the line of separation between side wall sections 30, 40. The movement of releasable latching mechanism 66 from the unlatched position shown in FIG. 1 to the latched position shown in FIG. 7 is more easily seen in FIGS. 8 and 9, respectively. The "track" along which releasable latching mechanism moves between the latched and unlatched position is the recessed free end section 70 of each of side wall sections 30, 40. However, it will be appreciated by those of ordinary skill in the art upon reading this disclosure that other similarly effective conventional latching mechanisms such as, for example, straps, snaps, hooks or other selectively releasable mechanical interlocks can also be used to secure halves 22, 24 of pad holder 20 in the unfolded position shown in FIG. 1 prior to use.

Figure 5:
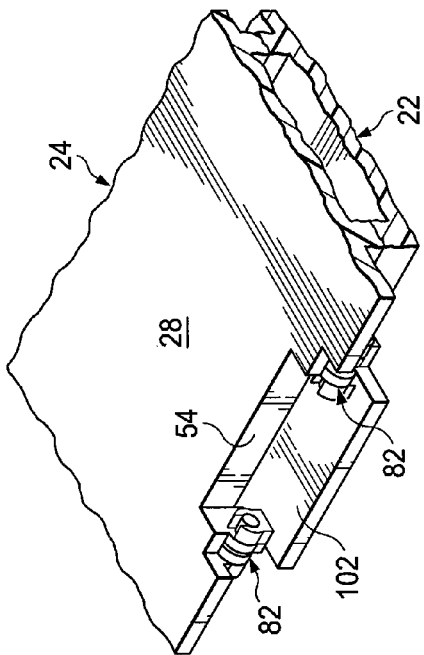
FIG. 5 is a detail view showing the two exploded portions of the FIG. 4 that are joined by engaging the aligned portions of the hinge elements, with one half being folded under the other along the hinge line.
Figure 4:
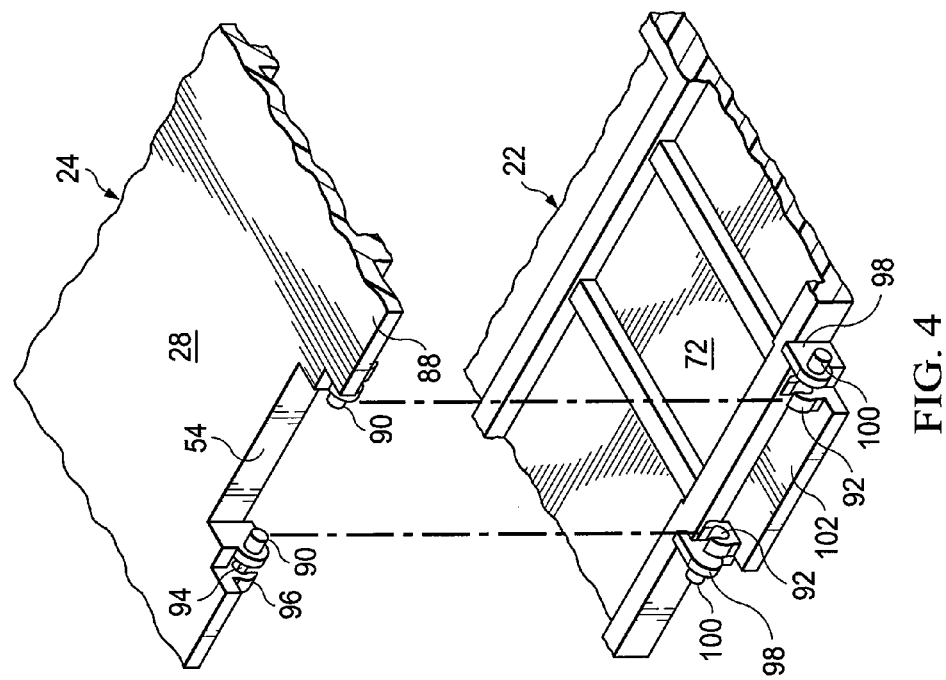
FIG. 4 is an exploded detail view showing the alignment of portions of the hinge elements on a portion of each half of the pad holder.
Figure 6:
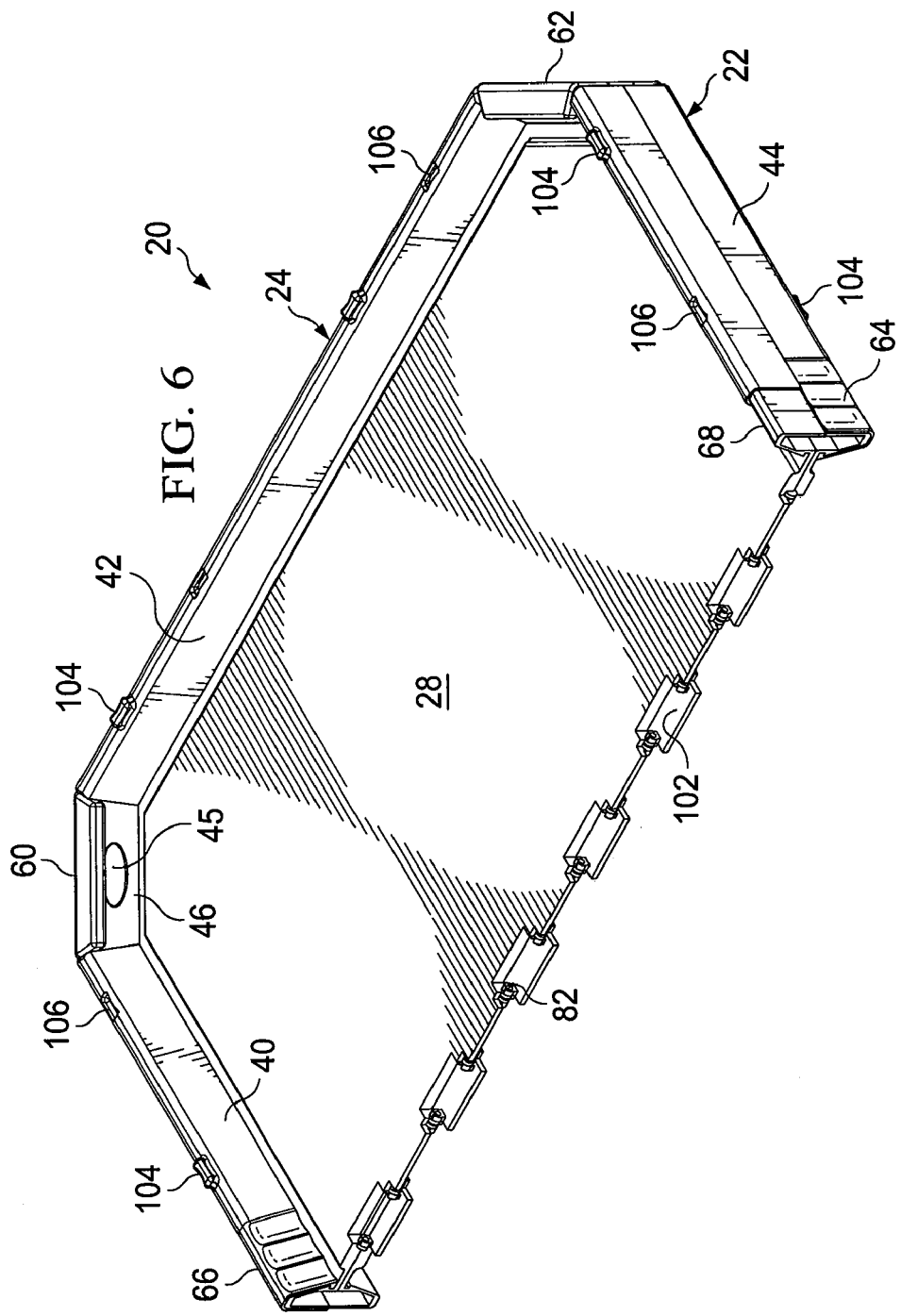
FIG. 6 is an assembled view of the two halves of the pad holder of FIG. 3, with the hinge elements engaged and one half folded under the other in the shipment or storage position when not in use.

FIG. 6 discloses pad holder 20 of FIG. 1 with half 22 folded back under half 24 in a preferred position for packaging, shipment or storage of pad holder 20. Pad holder 20 is folded along hinge line 50 (identified in FIG. 1), which can be done when releasable latching mechanisms 64, 66 are unlatched and disposed in the positions shown in FIG. 1. FIG. 3 is an exploded view of halves 22, 24 prior to engagement of the hinge sections on the hinge side of each of bottom wall sections 26, 28. FIG. 4 is an enlarged, detail view of a hinge section when halves 22, 24 of pad holder 20 are exploded prior to engagement of the two halves as shown in FIG. 3. FIG. 5 is an enlarged, detail view showing the same hinge section as in FIG. 4 when the two halves are assembled by connecting the cooperatively aligned hinge sections of each half, which orients halves 22, 24 in the same position as when half 22 is folded under half 24 as shown in FIG. 6.

Referring to FIG. 4, a hinge section of half 24 overlies a cooperatively aligned hinge section comprising spaced apart hinges 82 of half 22. In one preferred embodiment as shown, two facing cylindrical projections 90 are positioned to snap into engagement with upwardly opening clevises 92 while slot 94 slides down over and receives upwardly projecting fin 98 and oppositely facing cylindrical projections 100 snap into engagement with downwardly opening clevises 96 (only one of which is visible in FIG. 4) of half 24. After each spaced-apart hinge section 82 along hinge line 50 (FIG. 1) of pad holder 20 is connected in the manner shown in FIG. 5 so that halves 22, 24 are connected, half 22 can be folded out from under half 24 to place halves 22, 24, and more particularly, bottom wall sections 26, 28, in a substantially coplanar configuration as shown in FIG. 1. Alternatively, the hinge sections of each respective half 22, 24 can also be cooperatively aligned and engaged while halves 22, 24 are lying in the unfolded position substantially as shown in FIG. 1. When halves 22, 24 are unfolded, tabs 102 of half 22 are rotated into a position where they fit into recesses 54 of half 24, and tabs 88 of half 24 fit into recesses 52 of half 22.

Figure 10:
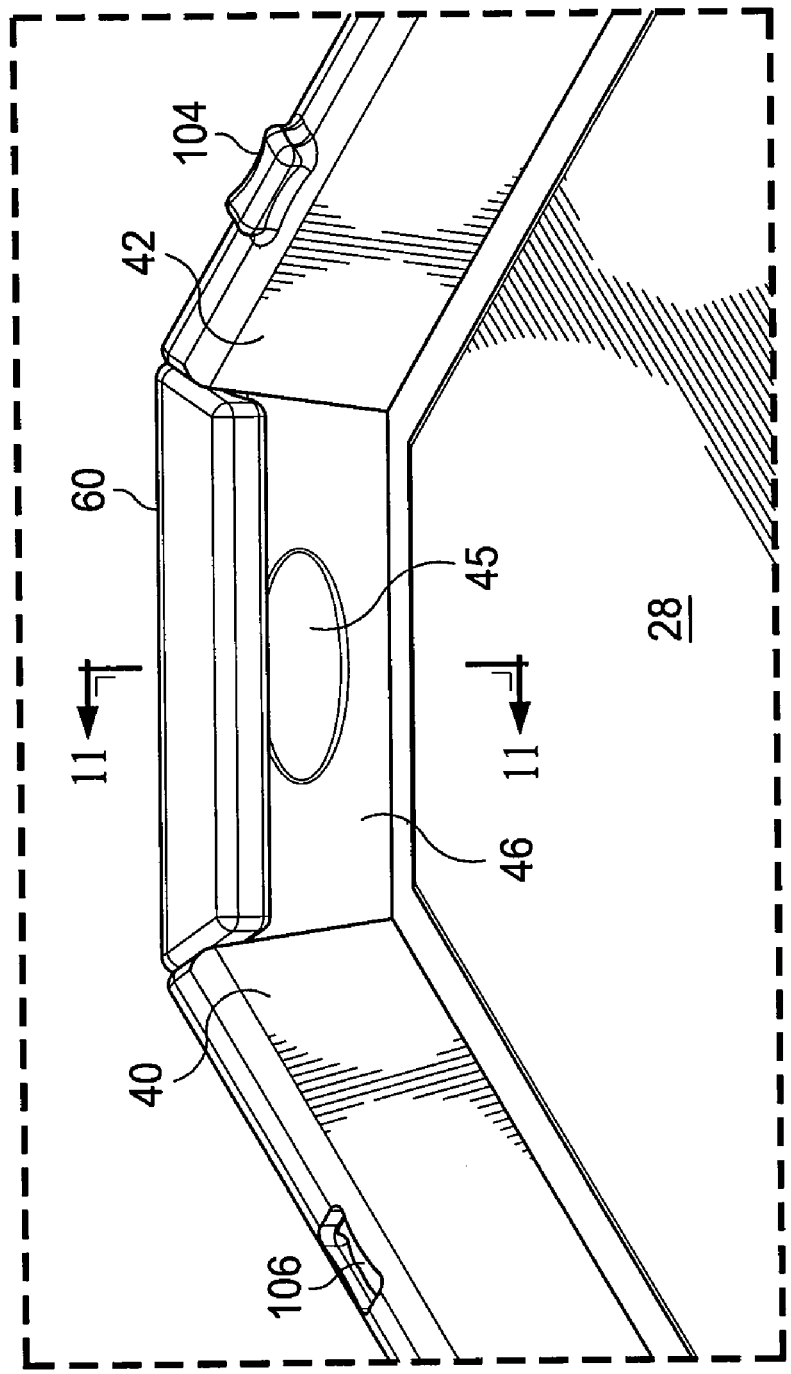
FIG. 10 is a detail perspective view taken from FIG. 1, showing a corner wall section and a pad attachment device disposed in the lower (locked) position.
Figure 13:
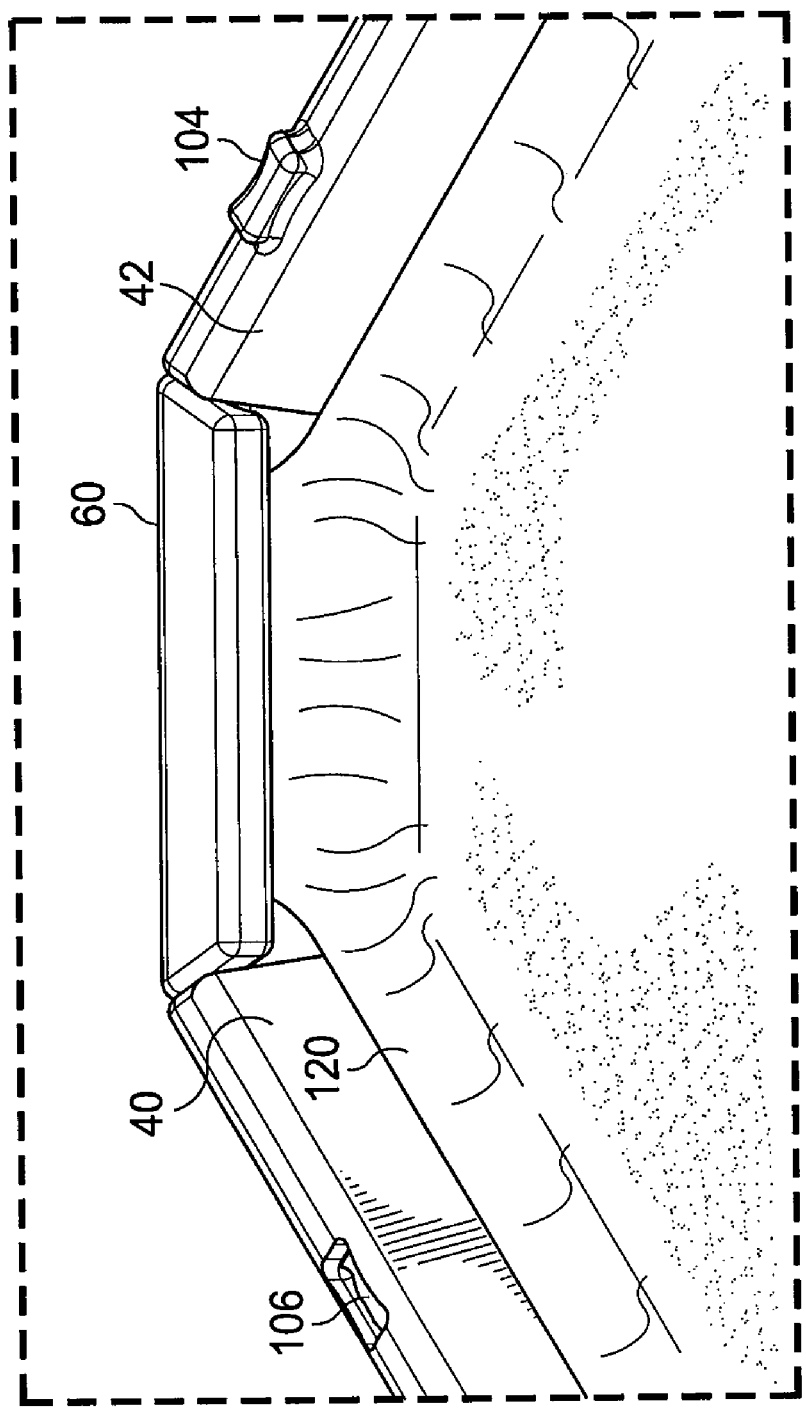
FIG. 13 is an enlarged top perspective view of a corner of the pad holder of FIG. 1 showing an absorbent pad installed in the pad holder with a corner of the absorbent pad being releasably held or captured beneath a pad attachment device.

Referring to FIGS. 1, 2, 10, 11, 12A and 12B, each corner wall section 36, 38, 46, 48 preferably further comprises a selectively releasable pad attachment device 56, 58, 60, 62 adapted to engage, hold or grasp a corner of an absorbent pad during use, when pad holder 20 is deployed in the unfolded, use position, without pressing the pad downwardly against either of bottom wall sections 26, 28. Referring to FIG. 10, corner wall section 46 is disposed between and desirably either abuts against or is unitarily molded to each adjacent side wall section 40, 42 and bottom wall section 28. Referring to FIG. 10, a recess or indentation 45 is desirably provided to assist a user of pad holder 20 in grasping the underside of pad attachment device 60 and lifting it upward relative to corner wall 46 prior to securing an absorbent pad inside pad holder 20. Also visible in FIG. 10 along the top edges of side wall sections 40, 42 are recess 106 and an upwardly projecting boss 104 that are representative of a plurality of such elements disposed in spaced-apart, alternating relation around the perimeter of pad holder 20 as seen in FIG. 1. When configured in this manner, each upwardly projecting boss 104 is desirably positioned opposite and aligned with an associated recess 106 when pad holder 20 is folded for packaging, shipment and/or storage, thereby providing frictional engagement between each cooperatively aligned pair of folded pad holders 20 in a stack.

Referring to FIG. 11, a cross-section taken through corner wall 46 of FIG. 10, recess 45 is visible under pad attachment device 60, which can be manipulated upwardly or downwardly as indicated by arrow 108 when installing or removing an absorbent pad (not shown) from the device. Also visible are a portion of bottom wall section 28 and shallow trough 31 disposed at the base of corner wall 46. Referring next to FIG. 12A, pad attachment device 60 has been pulled upwardly relative to the top of corner wall 46 as indicated by arrow 110. In the embodiment shown, pad attachment device 60 slidably engages a track 114 molded into corner wall section 46. A corner portion of absorbent pad 120 has been pulled upwardly onto the top of corner wall section 46. Referring next to FIG. 12B, pad attachment device 60 is pressed downwardly as indicated by arrow 112 to releasably capture and hold the corner portion of pad 120 between the underside of pad attachment device 60 and the top of corner wall section 46. A top perspective view of the corner of pad holder 20 as seen in FIG. 10, but with absorbent pad 120 disposed inside pad holder 20 and overlying bottom wall section 28, and a corner of absorbent pad 120 releasably captured and held against the top of corner wall 46 by pad attachment device 60. FIG. 7 is a cross-sectional view taken along line 7-7, transverse to hinge line 50, of FIG. 1, but also showing absorbent pad 120 captured by pad attachment devices 56, 60 disposed at opposite ends of pad holder 20.

Referring to FIGS. 14, 14A, and 14B, an alternate preferred embodiment is shown that uses an alternate pad attachment device. Just like in the first described embodiment, each corner wall section 36, 38, 46, 48 further comprises a selectively releasable pad attachment device 56', 58', 60', 62' adapted to engage, hold or grasp a corner of an absorbent pad during use, when pad holder 20 is deployed in the unfolded, use position, without pressing the pad downwardly against either of bottom wall sections 26, 28. The alternate embodiment differs from the first preferred embodiment in that a different structure is used for the selectively releasable pad attachment device as depicted by 60' in FIGS. 14A and 14B. Referring to FIG. 14, a recess or indentation 45 is desirably provided to assist a user of pad holder 20 in grasping the underside of lip 124 of the pad attachment device 60' and rotating the pad attachment device 60' with respect to corner wall 46 prior to securing an absorbent pad inside pad holder 20. Also visible in FIG. 14 along the top edges of side wall sections 40, 42 are recess 106 and an upwardly projecting boss 104 that are representative of a plurality of such elements disposed in spaced-apart, alternating relation around the perimeter of pad holder 20 as seen in FIG. 1. When configured in this manner, each upwardly projecting boss 104 is desirably positioned opposite and aligned with an associated recess 106 when pad holder 20 is folded for packaging, shipment and/or storage, thereby providing frictional engagement between each cooperatively aligned pair of folded pad holders 20 in a stack.

Referring to FIGS. 14A and 14B, which are both a cross-section view taken through corner wall 46 of FIG. 14 along line identified as 14A-14A and 14B-14B, recess 45 is visible under pad attachment device 60'. Also visible are a portion of bottom wall section 28 and shallow trough 31 disposed at the base of corner wall 46. Pad attachment device 60' is rotatably secured to corner wall 46 by hinge pin 122. Hinge pin 122 is preferably integrally molded with the outer portion of corner wall 46 on each side of pad attachment device 60' and seats in a corresponding hole on each end of pad attachment device 60' Referring to FIG. 14A, pad attachment device 60' has been rotated away from the top of corner wall 46 in the direction opposite of arrow 126 so that pad 120 can be positioned on the top of corner wall 46. A corner portion of absorbent pad 120 has been pulled upwardly onto the top of corner wall section 46. Pad attachment device 60' is rotated as indicated by arrow 126 to releasably capture and hold the corner portion of pad 120 between the underside of pad attachment device 60' and the top of corner wall section 46 as shown in FIG. 14B.

One of skill will recognize numerous ways to allow pad attachment device 60' to rotate over corner wall 46 and still allow lip 124 of pad attachment device 60' to secure pad 120 against corner wall 46. Examples include forming pad attachment device 60' so that lip 124 can slightly flex to pass over the top of corner wall 46 and then return to its original shape to hold pad 120 against corner wall 46. Alternatively, hinge pin 122 can be seated in a vertical slot instead of a cylindrical hole on each end of the pad attachment device 60'. This would allow pad attachment device 60' to move up as it is rotated in place in a manner similar to the first preferred embodiment. Even if a slot is not used, depending upon the materials and manufacturing techniques used, there may be a slight amount of "play" between hinge pin 122 and the corresponding hole in pad attachment device 60' that will allow lip 124 to slightly lift as it rotates over corner wall 46. This is generally sufficient when coupled with the natural flexibility present in pad attachment device 60' when it is molded out of a polymeric material to allow lip 124 to pass over corner wall 46 and yet still be able to press pad 120 against corner wall 46.

To the extent that additional support is desired, one or more protrusions 128 can be included along the width of pad attachment device 60'. These additional protrusions 128 can provide additional contact points to hold pad 120 against the top of corner wall 46. More preferably, as shown in FIG. 14B, protrusions 128 can push pad 120 against the outside of a raised ridge 130 at the top of corner wall 46. In this way, pad 120 is pinched between lip 124 and protrusion 128 against both sides of raised ridge 130 at the top of corner wall 46.

Alternatively, it will be apparent to those of ordinary skill in the art upon reading the present disclosure that other functionally equivalent pad holding devices can be similarly configured to releasably attach an absorbent pad to restrict relative movement between the pad and an underlying bottom wall of a pad holder such as pad holder 20 without pressuring any portion of the absorbent pad against the bottom wall.

Figure 2:
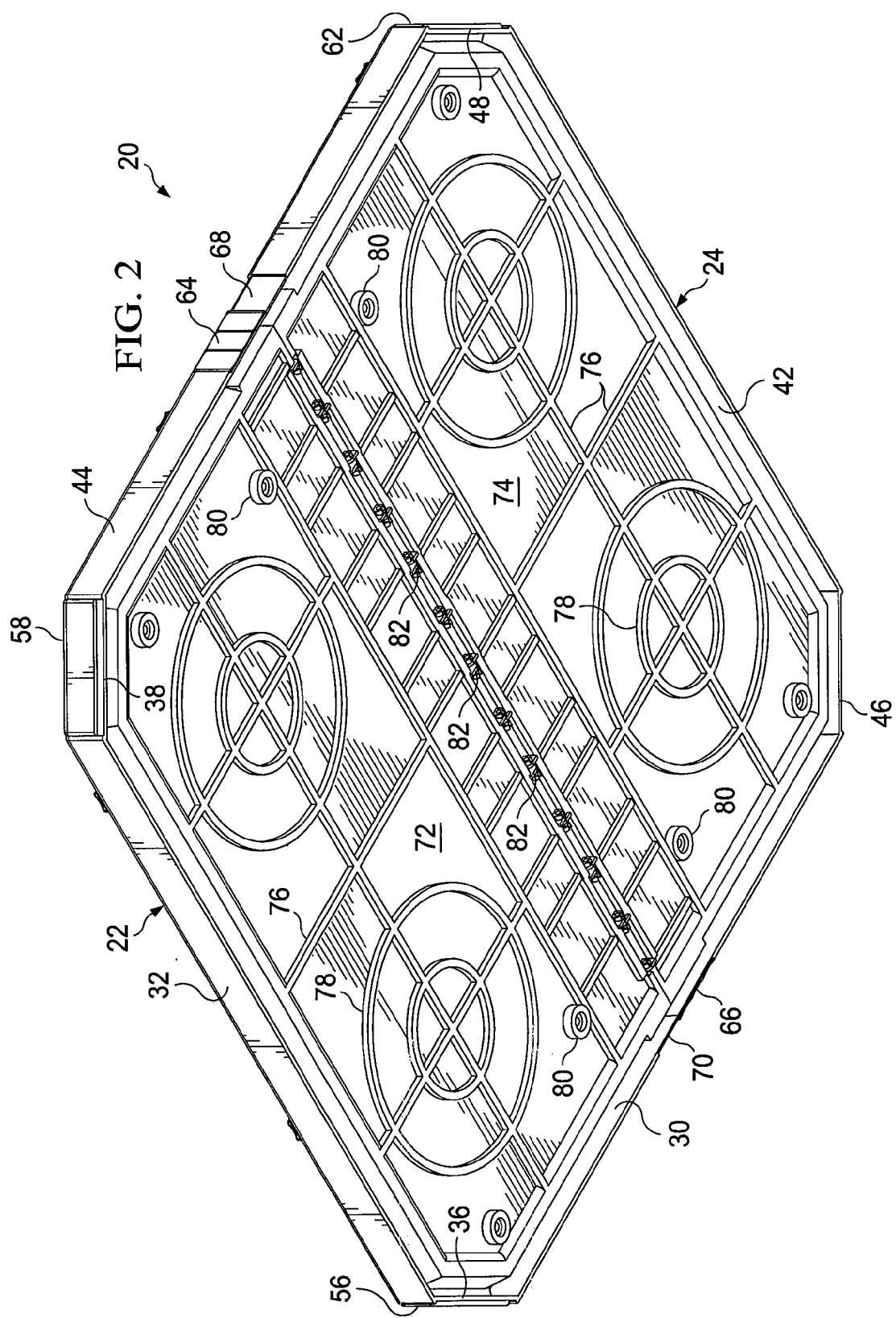
FIG. 2 is a bottom perspective view of the pad holder of FIG. 1.

Referring to FIG. 2, undersides 72, 74 of halves 22, 24 of pad holder 20 are shown to demonstrate one way in which a plurality of spaced-apart, cylindrical bosses or pedestals 80 and a grid or network of intersecting linear ribs 76 and arcuate ribs 78 disposed in a suitably configured array can provide structural support and reinforcement to the undersides 72, 74 of the bottom wall and maintain the bottom wall in a substantially level position relative to an underlying support surface such as a floor, even when an animal is standing or moving on an absorbent pad installed inside pad holder 20. In FIG. 2, halves 22, 24 are disposed in the same unfolded position as in FIG. 1, except that releasable locking elements 64, 66 have been moved to the locking position relative to the line of hinge sections 82. Those of ordinary skill in the art will understand upon reading this disclosure in relation to the accompanying disclosure that the configuration of integrally molded structural supports shown in FIG. 2 are merely illustrative of the many different configurations that can be used in making pad holders 20 of the invention.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventors are legally entitled.

We claim:

1. A holder for an absorbent pad that is generally square or rectangular, the holder comprising:

first and second halves connected by a hinge, each of the first and second halves further comprising a bottom wall section having a hinged side and at least three walled-in sides, wherein the hinge side comprises at least one hinge configured to allow the first half to be selectively folded under the second half in a first position or unfolded and laid substantially flat in a second position wherein the first half is substantially coplanar with the second half to form in combination a bottom wall having a substantially continuous support surface sized to receive and support a major portion of an absorbent pad inwardly of the walled-in sides; and at least one releasable locking element configured for use in selectively limiting relative rotational movement between the first and second halves around the hinge when the first and second halves are disposed in the second position during use; wherein each of the first and second halves each also comprises at least one pad attachment device configured to selectively and releasably engage and secure a portion of the absorbent pad inside that respective half of the holder without pressuring the absorbent pad downwardly against the bottom wall.

2. The holder of claim 1 wherein the walled-in sides of the bottom wall section of each of the first and second halves is bounded by a plurality of wall sections including at least three spaced-apart side wall sections and two spaced-apart corner wall sections that extend upwardly above the bottom wall section when the two halves are in the second position.

3. The holder of claim 2 wherein each corner wall section is disposed between two side wall sections.

4. The holder of claim 3 wherein each corner wall section is disposed obliquely in relation to each side wall section.

5. The holder of claim 2 wherein the side wall sections and corner wall sections of each of the first and second halves are integrally formed.

6. The holder of claim 2 wherein the side wall sections, corner wall sections and bottom wall section of each of the first and second halves are unitarily molded.

7. The holder of claim 6 wherein the side wall sections, corner wall sections and bottom wall section of each of the first and second halves are unitarily molded from a moldable polymeric material.

8. The holder of claim 1 wherein a hinge line is disposed between the first and second halves and at least one releasable locking element is provided to selectively inhibit rotational movement of the first half relative to the second half around the hinge line.

9. The holder of claim 8 wherein one releasable locking element is transversely disposed at each end of the hinge line to selectively lock the two halves in the second position.

10. The holder of claim 1 wherein the at least one releasable locking element is selectively movable along at least a portion of a side wall section of the first half to releasably lock the side wall section of the first half to a longitudinally aligned side wall section of the second half.

11. The holder of claim 2 wherein each corner wall section comprises a pad attachment device.

12. The holder of claim 11 wherein a pad attachment device slidably engages each corner wall section.

13. The holder of claim 11 wherein each corner wall section further comprises an interiorly facing recess that facilitates access to and manual manipulation of the pad attachment device when installing or removing absorbent pads.

14. The holder of claim 1 wherein the hinged side of each of the first and second halves comprises a plurality of hinge elements, and wherein the hinge elements of the first side are cooperatively positionable and selectively engageable with the hinge elements of the second side.

15. The holder of claim 11 in combination with an absorbent pad, wherein each pad attachment device holds a corner of the absorbent pad in substantially fixed relation to a corner wall of the holder during use.

16. The holder of claim 2 wherein a plurality of projections and recesses are spaced apart at or near the top of a plurality of sidewall sections, each recess of the pad holder being configured and cooperatively aligned to receive a projection from a second pad holder stacked together with the pad holder.

* * * * *